United States Patent
Ahlmark et al.

(10) Patent No.: US 8,318,118 B2
(45) Date of Patent: Nov. 27, 2012

(54) PROCESS FOR THE TREATMENT OF GAS PHASE ALKALINE CHLORIDE IN A COMBUSTION PLANT

(75) Inventors: Matts Ahlmark, Stockholm (SE); Magnus Berg, Trosa (SE)

(73) Assignee: Vattenfall AB, Stockholm (SE)

( * ) Notice: Subject to any disclaimer, the term of this patent is extended or adjusted under 35 U.S.C. 154(b) by 601 days.

(21) Appl. No.: 12/422,471

(22) Filed: Apr. 13, 2009

(65) Prior Publication Data
US 2009/0257936 A1 Oct. 15, 2009

(30) Foreign Application Priority Data
Apr. 14, 2008 (SE) .................................. 0800844

(51) Int. Cl.
*B01D 53/68* (2006.01)
*F23J 15/00* (2006.01)
(52) U.S. Cl. ............... 423/240 R; 423/240 S; 423/305; 423/311; 423/312; 423/313; 423/314; 423/315; 60/351
(58) Field of Classification Search ............. 423/240 R, 423/240 S, 305, 311–315; 60/651
See application file for complete search history.

(56) References Cited

U.S. PATENT DOCUMENTS

| 1,799,479 | A | | 4/1931 | Pike |
| 4,043,768 | A | * | 8/1977 | Bennett et al. ................. 95/60 |
| 5,114,460 | A | * | 5/1992 | Nguyen et al. .................. 71/34 |
| 5,443,808 | A | * | 8/1995 | Weckman et al. ............ 423/309 |
| 2004/0068988 | A1 | * | 4/2004 | Anderson ..................... 60/651 |

FOREIGN PATENT DOCUMENTS
WO   WO 02/059526 A1   8/2002

OTHER PUBLICATIONS
Extended European Search Report dated Aug. 27, 2009.

* cited by examiner

*Primary Examiner* — Ngoc-Yen Nguyen
(74) *Attorney, Agent, or Firm* — Young & Thompson

(57) ABSTRACT

A process for the treatment of gas phase alkaline chlorides in a combustion plant that is arranged for combustion of solid fuel and which includes a combustion chamber from which a flue-gas flow is directed to pass a heat transfer device. A phosphorous substance is added to the flue-gas flow, separate from the fuel, the substance chosen from a group of substances that form phosphorous oxide at combustion temperatures of approx. 500° C. or above, wherein the phosphorous substance is distributed in the flue-gas at a location upstream of the heat transfer device. The phosphorous substance is added to an amount which results in phosphatising of gas phase alkaline chlorides included in the flue-gas flow before the chlorides reach the heat transfer device. A corresponding combustion plant is disclosed, as well as the use of a phosphorous substance for phosphatising alkaline chloride in gaseous phase in a flue-gas flow.

19 Claims, 1 Drawing Sheet

PROCESS FOR THE TREATMENT OF GAS PHASE ALKALINE CHLORIDE IN A COMBUSTION PLANT

TECHNICAL FIELD OF THE INVENTION

Figure 1:
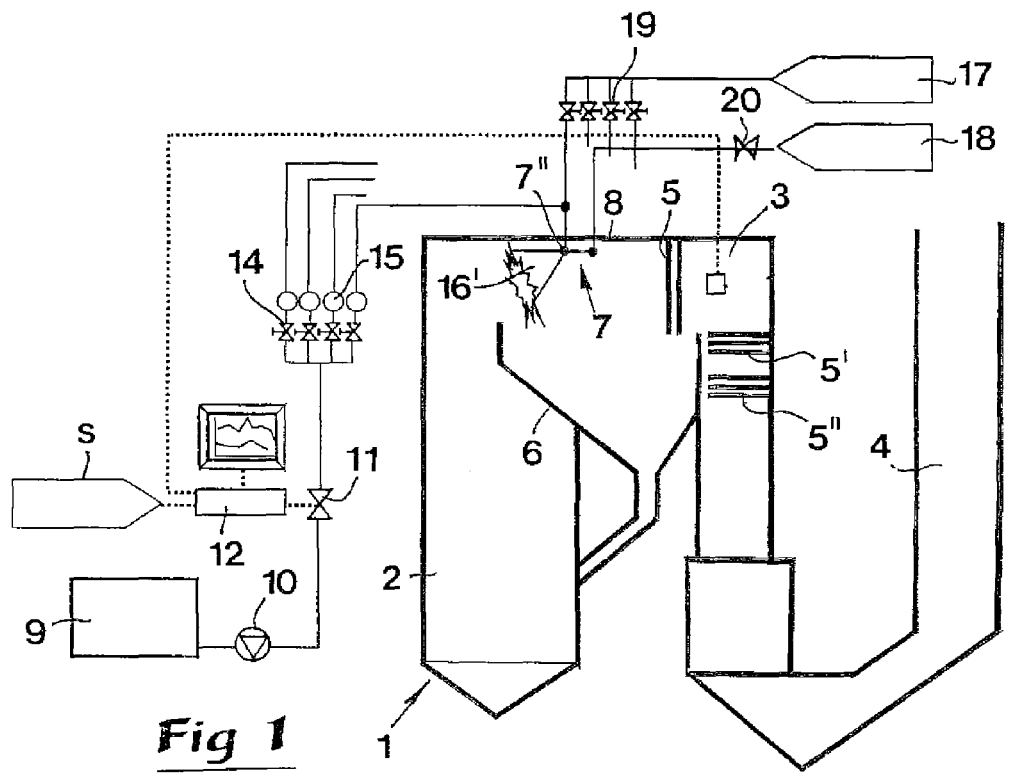

This invention relates in a first aspect to a process for reducing corrosion in combustion plants caused from chlorine in alkaline chloride which is formed in combustion of solid fuels containing chlorine, the process involving treatment for conversion of the chloride to a less corrosive composition. In a second aspect, the invention relates to a combustion plant arranged for carrying out the process. In a third aspect, the invention relates to the use of a phosphorous substance in a combustion plant for the treatment and conversion of gas phase alkaline chloride to less corrosive phosphate.

BACKGROUND AND PRIOR ART

It is a known problem within the circle of persons skilled in the art, that chlorine which is formed in combustion of chlorine-containing fuel leads to corrosion in combustion plants. It is commonly assumed that chlorine is transported in combustion gases in the form of gas phase alkaline chloride (in wood fuel combustion mostly as potassium chloride KCl), alternatively in the form of quite small aerosols of alkaline chloride, to the surface of super heaters and other components that are exposed to the flue-gas in the combustion plant. Reactions between the alkaline chloride and iron oxide, e.g., which may take place on the said surfaces, results in formation of free chlorine which is strongly corrosive in this state.

It is also previously known that addition of sulphur to the fuel may have an effect for reduction of corrosion caused by chlorine. The prior art further includes the addition of sulphur outside the fuel, such as in the flue-gas downstream the proper combustion zone. The purpose of these solutions is to provide reactive sulphur dioxide or sulphur trioxide for sulphating alkaline chloride in the gaseous phase, before the same reaches the surfaces of the combustion plant which are subject to chlorine-induced corrosion. Examples on the latter solutions are found, inter alia, in DE 19849022 and WO 02/059526.

The ability of sulphur to reduce the chlorine content in deposits on heat transferring devices is believed to result from conversion of alkaline chloride to alkaline sulphate in the flue-gas, before reaching the heat transferring devices, according to the sum formula:

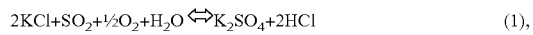
(1), the equilibrium of which is displaced to the right at flue-gas temperatures below 800° C.

Test measurements have shown that a fairly high concentration of $SO_2$ is required in the flue-gas in order for KCl to be significantly reduced in flue-gas temperatures at about 500-1200° C., which equals the temperature range within which the super-heaters in the most common type of combustion plants operate. For instance, measurements at burning wood chips have shown that an $SO_2$ content corresponding to approx. 50-150 mg S/MJ (Mega Joule) fuel is required in the flue-gas in order to achieve a 50% reduction of the potassium chloride content in the flue-gas ahead of the super heaters. This equals an S/Cl mole ratio in the flue-gas of approx. 3-10. The increase of the sulphur dioxide content in the flue-gas entails negative consequences in the form of increased $SO_2$ emissions from the plant (problems with emission regulations and environmental permits) and an increased risk of low-temperature corrosion. The reason for such a large $SO_2$ redundancy being required is that the reaction (1) is kinetically limited at the flue-gas temperature in question, and has therefore no time to reach equilibrium before the chloride encounters the super heaters.

The reaction (1) is an overall reaction including a plurality of sub-steps. An important sub-step is considered to be:

(2)

where M is a catalyst for the oxidation. The sulphur trioxide formed will further react with the alkaline chloride according to the formula:

(3)

M may, for instance, be iron oxide. The equilibrium of the reaction (2) moves to the right at decreasing temperature. At temperatures of about 700° C., the content of $SO_2$ and $SO_3$, respectively, is equally large at equilibrium (depending on the sulphur content and oxygen content). In absence of the catalyst M, reaction (2) is slow at temperatures below 900° C. In flue-gas, normally the concentration of M is slow in relation to the gaseous phase reactants oxygen and sulphur trioxide. As a consequence, just a minor part of the sulphur dioxide has time to oxidise to sulphur trioxide before the flue-gas leaves the plant. This has been verified by measurements of the $SO_3$-content in flue-gas at approx. 150° C., which indicates that only approx. 1-3% of the total sulphur oxide content in gaseous phase is present as $SO_3$.

The problem of ensuring access to required amounts of reactant $SO_3$ is satisfactory solved in WO 02/059526, which teaches addition of sulphurous compounds that instantly form $SO_3$ for sulphating alkaline chloride in gaseous phase at the subject temperature range.

A non-solved problem is however that in some operational conditions the resulting sulphate is instable which may lead to a decreased technical effect.

OBJECT OF THE INVENTION

The present invention aims to eliminate the problem and provide an alternative solution for avoiding or at least reducing chlorine-induced corrosion in combustion plants.

The object is met by a process according to the invention. A combustion plant as well as the use of a phosphorous substance to meet the object of the invention is additionally provided in analogy with the process.

Briefly, the stated object is met as the strongly corrosive alkaline chloride is converted into less corrosive phosphate while in gaseous phase in the flue-gas. The invention is more closely explained below with reference made to the attached schematic drawings.

DESCRIPTION OF THE INVENTION

The expression "phosphorous substance" shall in this connection be understood as a substance or a composition wherein phosphor, chemically named P, is included as a product of decomposition which is released, isolated or together with other substance, within a temperature window found in a combustion plant arranged for combustion of solid fuels. The expression "combustion plant" refers to that part of a heat production plant which includes the actual combustion chamber and its extension toward and beyond heat transfer devices by which heat is withdrawn from the flue-gas. The expression "super heater" shall be understood as being encompassed in the expression heat transfer device. "Solid fuel" indicates that a main part of the fuel consists of solid material. Typical fuel examples are bio-fuel such as municipal waste, recycled wood and forest residues, or fossil fuel such as brown coal and peat, as well as here not mentioned fuel which contains chlorine that is converted to alkaline chloride during its combustion. "Flue-gas" refers to the hot gas which forms upon combustion of the fuel, and which is guided to pass the heat transfer devices toward a discharge from the combustion plant.

In a first aspect the invention provides a process for the treatment of gas phase alkaline chloride in a combustion plant that is arranged for combustion of solid fuel and which comprises a combustion chamber from which a flue-gas flow is directed to pass a heat transfer device. The process is characterized by the step of adding to the flue-gas flow a phosphorous substance, separate from the fuel, the substance chosen from a group of substances that form phosphorous oxide at combustion temperatures of approx. 500° C. or above, wherein the phosphorous substance is distributed in the flue-gas at a location upstream of the heat transfer device as viewed in the flow direction of the flue-gas, and wherein the phosphorous substance is added to an amount which results in phosphatising of gas phase alkaline chloride included in the flue-gas before the chloride reach the heat transfer device.

One condition to be met in order to achieve the desired result is that the added substance decomposes to form phosphorous oxide within the temperatures prevailing at the area upstream of the heat transfer device. A preferred example of a substance for addition is phosphoric acid $H_3PO_4$ which forms phosphorous pentoxide $P_2O_5$. Phosphorous pentoxide is an anhydride of phosphoric acid and is commercially available in form of a white crystalline material which can be produced by burning elementary phosphor while adding air $(P_4+5O_2 \rightarrow 2P_2O_5)$. Phosphorous pentoxide melts at a temperature of 569° C. and sublimes at a temperature of 360° C. As an example, the chloride-reducing reaction between phosphorous pentoxide and potassium chloride in the flue-gas can be described as follow:

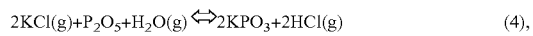
$2KCl(g)+P_2O_5+H_2O(g) \Leftrightarrow 2KPO_3+2HCl(g)$     (4), or alternatively:

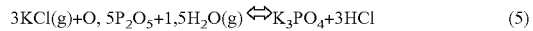
$3KCl(g)+O, 5P_2O_5+1,5H_2O(g) \Leftrightarrow K_3PO_4+3HCl$     (5)

However, phosphoric acid appears also in other forms beside the above said phosphorous pentoxide. To be mentioned are for instance phosphorous trioxide $P_2O_3$ as well as $P_4O_6$ and the intermediate structures up to $P_4O_{10}$. The reaction with alkaline chloride in gaseous phase that is utilized by the present invention can thus be generally illustrated as follow:

$MCl+PO+H_2O \Leftrightarrow MPO+HCl$     (6), where MCl represents a metal chloride, PO represents a phosphorous oxide, and MPO the resulting metal phosphate.

The resulting phosphate is with respect to its state of equilibrium a more stable composition than is the sulphate or chloride of a given metal. In other words, when reactive phosphoric acid is available in the flue-gas, the formation of phosphate is favoured before formation of chloride as well as sulphate.

As compared with sulphate, e.g., the phosphate is also stable at higher temperature. The equilibrium in the reaction of (3) favours the formation of sulphate at temperatures below 800° C., whereas at higher temperatures $SO_3+KCl$ is favoured, which means in practise that sulphating of chloride becomes less effective at rising temperatures. $KPO_3$ is stable up to 1000° C., which means that the reduction of alkaline chloride can be ensured at higher temperature when a phosphorous substance such as a phosphate is used, as compared to a case relying on previously known additives based on sulphur.

The technical advantage of the invention is thus that corrosive alkaline chloride is converted into a more stable composition by phosphatising, than is the case upon conversion into a sulphate.

In an alternative embodiment, the invention teaches addition of a phosphate which at the subject temperatures decomposes to form phosphorous oxide in the flue-gas. Examples of suitable phosphates are for instance ammonium phosphate $(NH_4)_3PO_4$, ammonium dihydrogen phosphate $(NH_4)H_2PO_4$ or diammonium hydrogen phosphate $(NH_4)_2HPO_4$. Other suitable phosphate compositions are for instance aluminium phosphate $AlPO_4$, iron (III) phosphate $FePO_4$ or iron (II) phosphate $Fe_3(PO_4)_2$.

From the above it will be understood that the invention is not limited to these examples but includes any phosphorous compound which forms reactive constituents in the flue-gas, especially phosphoric acid, for the purpose of phosphatising occurring alkaline chloride while the same is in gaseous phase, i.e. before depositing on surfaces in the combustion plant which are exposed for corrosion.

The field of useful additives is however limited to those phosphorous substances or compounds which are suitable for feeding and distribution in the flue-gas. Particularly suitable are those phosphorous compounds which are soluble in water and which can be introduced in the form of a water solution. However, solubility in water is not a requisite for a suitable additive, since the substance may as well be added in the form of slurry or as a dispersion containing solid particles of a substance which is mixed in water or other liquid. If appropriate, addition of the phosphorous substance can alternatively be accomplished pneumatically, involving air or other gas as a carrier for the substance.

Introducing the additive is advantageously achieved by means of individual nozzles or sets of nozzles. Furthermore, the additive may be introduced at one or several levels in the area upstream of that most upstream heat transfer device which is located closest to the combustion area, as viewed in the flow direction of the flue-gas. The distance to the heat transfer device is chosen with respect at least to flue-gas temperature, flue-gas flow velocity, reaction time of the substance and available or required time of contact before the flue-gas reach the subject heat transfer device. Specific recommendations in this context is however possible only upon consideration of the structure and operational data of a chosen combustion plant. It will however be well within reach of the skilled person, from one case to another, to find a suitable location of introduction. The flue-gas composition and temperature can be controlled, using tested measurement methods described in other documents, in order to verify that the expected reaction takes place. Monitoring of operating conditions is included as a natural part of the continuous production control of a combustion plant, for economic as well as for environmental reasons.

It is however presently preferred that introduction of the additive is made separate from the fuel and, more precisely, downstream the proper combustion zone. The introduction of the additive is preferably arranged downstream of the location for that last air injection position which is the uppermost one in a vertical boiler structure, as viewed in the flow direction of the flue-gas. However, the invention does not exclude a place of introduction which is located within the area of this uppermost air injection position, i.e. substantially at the centre of or even slightly upstream of the same, considering the chemical properties of the subject additive and the temperature of the combustion gas.

Thanks to the ability of the phosphorous additive to form stable phosphate compounds also in areas of higher temperature, the choice of a suitable point of introduction of the additive is expanded through the present invention. For instance, when compared to addition of a sulphurous compound for sulphating alkali chloride in gaseous phase, the invention provides a temperature window that is expanded by approx. 200° C. at the upper temperature limit to be considered as point of introduction in a chloride reduction process through phosphatising.

It will be understood that proportioning amounts shall be determined with respect to the subject fuel and the ability of the subject additive to form reactive phosphoric acid in the flue-gas. Adoption to the subject combustion plant is required also in this respect, and general recommendations can thus not be provided. However, a dosage which is required in order to achieve a desired reduction of alkali chloride in the flue-gas can be evaluated through one of the following methods:

- Direct in-situ measurement of the alkaline-chloride content in the flue-gas in the area of the first super heater, preferably by means of the measurement method being described in SE 9903656-8.
- Campaign measurement of composition and growth of the ash deposit which is formed on a temperature-controlled probe being exposed to flue-gas in connection with the super heater.
- Corrosion measurement with a temperature-controlled probe being exposed to flue-gas in connection with the super heater.
- On-line measurement of super heater corrosion using modern probe methods based on electrochemistry.
- Measurement of HCl (the reaction product in the phosphatising reaction 4, 5, 6), either in the area around the first super-heater or later on in the flue-gas flow. When the HCl content no longer increases with increased dosing of additive, it may be presumed that in principle all available alkaline chloride in the flue-gas has been phosphatised.

It is not necessary though to completely eliminate the alkaline chloride in order to benefit from the presented solution. Decreasing the concentration by about 50-80% is often enough to achieve a substantial reduction of chlorine-induced corrosion. The required degree of reduction depends on the composition of the fuel, operational conditions, kind of material in super-heaters, flue-gas temperature etc., and should be determined in each separate application.

In a second aspect of the present invention a combustion plant is provided and arranged for combustion of solid fuel, the combustion plant comprising a combustion chamber from where flue-gas is directed to pass by a heat transfer device. The combustion plant is in flow communication with a supply of phosphorous substance, and comprises means for introducing the phosphorous substance into the flue-gas flow, separate from the fuel, at a flue-gas temperature of 500° C. or above, upstream of the heat transfer device as viewed in the flow direction of the flue-gas.

In embodiments comprising injection of supply air for the combustion, the flow communication from the additive supply advantageously mouths in the combustion chamber in the area of, or downstream of, that air injection position which is the last one as viewed in the flow direction of the flue-gas.

The third aspect of the present invention relates to the use of a phosphorous substance for phosphatising alkaline chloride in gaseous phase in a combustion plant that is arranged for combustion of solid fuel according to the process discussed above. More specifically, the invention relates to the use of phosphoric acid ($H_3PO_4$) or phosphates, especially one or several of ammonium phosphate (($NH_4$)$_3PO_4$), ammonium dihydrogen phosphate (($NH_4$)$H_2PO_4$), diammonium hydrogen phosphate (($NH_4$)$_2HPO_4$), aluminium phosphate $AlPO_4$, iron (III) phosphate $FePO_4$ or iron (II) phosphate $Fe_3(PO_4)_2$, and other not mentioned phosphorous compounds that decompose to provide reactive phosphorous oxide at the prevailing temperatures.

SHORT DESCRIPTION OF THE DRAWINGS

A combustion plant suitable for carrying out the invention is shown in accompanying schematic drawings. In the drawings, FIG. 1 is a schematic elevation view illustrating the general assembly of a heat production plant having equipment for dosage of a phosphorous additive, and FIG. 2 is a schematic plan from above showing the same assembly and dosage equipment.

DETAILED DESCRIPTION OF THE INVENTION

Figure 2:
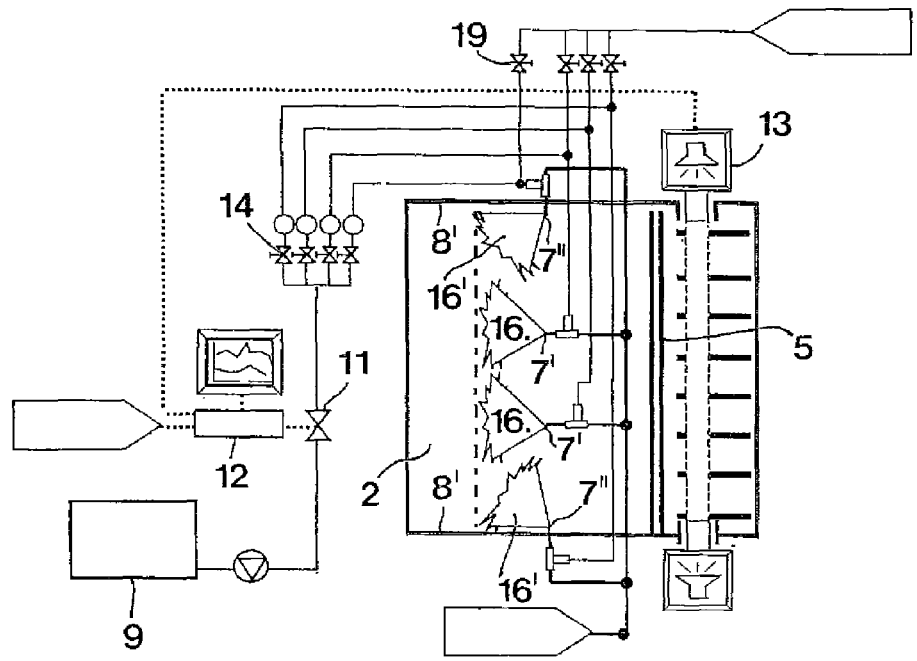

An example of a combustion plant which is suitable for the process is illustrated in FIGS. 1 and 2. This example comprises an industrial boiler, the main purpose of which is to produce steam such as for electricity production or alternatively for operation in a heat production plant. The combustion plant conventionally comprises an incinerator 1 having a combustion chamber 2, from which a flue-gas duct, generally indicated by reference number 3, extends toward a discharge end in the form of an exhaust stack 4. The incinerator 1, which may have a length in the range of 10-40 m, can be operating with conventional fluidized or bubbling bed technology (BFB). A plurality of successively arranged heat transfer devices are arranged in the flue-gas duct 3. Fluid, such as steam, air, water or other liquid is passed through the heat transfer devices to withdraw heat from the hot flue-gas passing by the heat transfer devices. In FIG. 1 these devices are illustrated as three super-heaters 5, 5', 5". Each of the super-heaters comprises a set of pipes or coiled pipes through which a fluid can pass for heating by transfer of heat from the flue-gas. A slanting wall 6 is extended between the combustion chamber 2 and the flue-gas duct 3. The wall 6 is included in a separator which is effective for collecting solid particles in the flue-gas and bringing them back to the combustion chamber, or feeding the particles out for deposit. As the flue-gas has passed by the super-heaters 5, 5', 5" the flue-gas is cooled down in one or several economizers (not shown), successively passing an air pre-heater (not shown) to be finally discharged via the stack 4 (usually upon passage of one or several electrostatic filters which are also not illustrated).

A device generally indicated by reference number 7 is located in a duct section downstream of the combustion chamber 2, and operative for injection of a phosphorous additive into the flue-gas. In the illustrated embodiment, this injection device 7 comprises a number of nozzles, and more specifically four nozzles 7', 7', 7" and 7"', all of which are located close to a wall 8 defining the duct. As is notable in FIGS. 1 and 2, the injection device 7 is located upstream and at a distance from that super-heater 5 which is the first one to be hit by the flue-gas. The distance from the first super-heater 5 to the injection device 7 is determined with respect to the reaction time required for phosphatising the alkaline chloride while the same is in gaseous phase, i.e. before depositing on the super-heater.

Beside the injection device 7, a tank 9 serving as a storage for the phosphorous substance is included in the equipment for dosage of the additive. The additive, such as a solution of ammonium phosphate, e.g., is delivered by means of a pump 10 from the tank 9 to a regulator unit 11 which controls the amount of additive to be introduced in the boiler. In practise, the regulator unit 11 can be realized as a pneumatically or electrically controlled valve combined with a flow meter for liquid. A separate control unit 12 is arranged to calculate the appropriate additive flow rate based on an analogous signal S representing the chloride content in the flue-gas and the boiler load as calculated by the boiler control system. The content of alkaline chloride can be measured by means of a measuring device 13. Advantageously, the measuring device may be configured as described in the above mentioned SE 9903656-8. The control unit 12 may be a computer. The flow of additive is split into partial flows downstream of the regulator unit 11 by means of branch pipes equipped with valves 14 that individually adjusts the size of each partial flow to the four nozzles 7', 7". The flow through each separate branch pipe is readable on flow indicators 15.

Two nozzles 7', out of the four nozzles that are included in the injector device 7, are located in a central area of the duct and oriented axially in order to eject two plumes of additive mainly in the axial direction of the duct, and more precisely contra the flow direction of the flue-gas. In other words, the nozzles are directed back toward the flue-gas inlet to the duct. The other two nozzles 7" are located sideways, and more precisely in the vicinity of two side walls 8' defining the duct 3. The two nozzles 7" are arranged for ejection of additive plumes 16' obliquely towards the flow direction of the flue-gas. The additive plumes 16 and 16', which are obliquely oriented downward from the upper wall 8, should be large enough so as to touch or slightly overlap each other. The outgoing flow of additive thus meets the advancing flue-gas for a mainly uniform mixing with the flue-gas. In order to control the drop-size, throw length and angle of spread from the nozzles independently of the additive amount, excess water from an excess water source 17 may be supplied to the nozzles together with compressed air from a compressed air source. The flow of excess water and compressed air is adjustable by means of the valves 19 and 20, respectively.

From the above said it is understood that the partial supplies of additive via the separate nozzles can be individually adjusted. Optimized amounts of additive can this way be introduced also in case zones of different temperature and flue-gas composition appear in the flue-gas.

It should be mentioned that the flue-gas temperature at the injection device, i.e. upstream of the first super-heater 5, can usually be in the range of 1200-500° C.

The effect of the additive dosage for reducing the chloride content in the flue-gas is measured in situ by means of the measuring device 13, advantageously located directly downstream the first super heater 5.

One or several conventional lances, shaped as pipes and extending from the side walls of the combustion chamber into said section of the flue-gas duct, can be used instead of the individual nozzles. The injection means may be realized as nozzles or holes which are axially spaced along the lance to effect injection of mutually touching additive plumes, e.g.

It shall finally be mentioned that certain types of heat production plants may comprise heat transfer devices which are located in the zone where combustion still takes place. The combustion zone may be identified as that part of the boiler where the fuel is substantially completely incinerated. The first heat transfer device to be hit by the flue-gas is a heat transfer device which is distanced from the proper combustion zone. In this connection it shall also be mentioned that the distance from the combustion zone to said first heat transfer device may be substantially longer than just a few metre, such as 10-50 m, e.g. It is usually preferred that the dosage of additive is made at a distance as far as possible away from the first heat transfer device, still avoiding dosage of the additive into the proper combustion zone. In embodiments where supplementary air is injected in the combustion zone, the dosage of additive is preferably accomplished downstream of that air injection position which is the last one as viewed in the flow direction of the flue-gas.

Primarily, the present invention achieves a corrosion-inhibiting treatment of alkaline chlorides in gaseous phase through phosphatising which results in more temperature stable compounds than what is achievable through conversion into sulphates. The technical features which define the solution provided herein are listed in the accompanying claims, wherein alternative embodiments of the invention are specified in subordinated claims.

The invention claimed is:

1. A process for the treatment of gas phase alkaline metal chlorides in flue-gas of a solid fuel combustion plant to reduce chlorine-induced corrosion, the plant having a combustion chamber from which a flue-gas flow is directed to pass a heat transfer device, the process comprising:
    (i) adding a phosphorous substance to the flue-gas flow the substance being selected from a group of substances that form phosphorous oxide at combustion temperatures of about 500° C. or above,
    wherein,
    the phosphorous substance is added separate from the fuel, and is distributed in the flue-gas at a temperature in a range of 500-1200° C. at a location upstream of the heat transfer device as viewed in the flow direction of the flue-gas, and
    (ii) phosphatising the gas phase alkaline metal chlorides in the flue-gas before the chlorides reach the heat transfer device.

2. The process of claim 1, wherein the phosphorous substance is soluble in water and is added to the flue-gas flow as a water solution.

3. The process of claim 1, wherein the phosphorous substance is added to the flue-gas flow in the form of a slurry comprising solid particles of the substance mixed in water or other liquid.

4. The process of claim 1, wherein the phosphorous substance is added to the flue-gas flow pneumatically.

5. The process of claim 1, wherein the phosphorous substance is phosphoric acid ($H_3PO_4$).

6. The process of claim 1, wherein the phosphorous substance is a phosphate.

7. The process of claim 6, wherein the phosphorous substance is aluminium phosphate ($AlPO_4$), iron(III) phosphate ($FePO_4$), iron(II) phosphate ($Fe_3(PO_4)_2$) or any combination thereof.

8. The process of claim 6, wherein the phosphorous substance is ammonium phosphate ($(NH_4)_3PO_4$), ammonium dihydrogen phosphate ($(NH_4)H_2PO_4$), diammonium hydrogen phosphate ($(NH_4)_2HPO_4$) or any combination thereof.

9. The process of claim 1, wherein the phosphorous substance reacts with alkaline metal chlorides in gaseous phase according to the general formula:

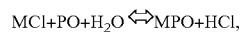

where MCl represents a metal chloride and PO represents a phosphorous oxide.

10. The process of claim 1, wherein the phosphorous substance is introduced in an area of a last air injection position in the combustion chamber as viewed in the flow direction of the flue-gas or downstream of said last air injection position.

11. The process of claim 3, wherein the phosphorous substance is a phosphate.

12. The process of claim 4, wherein the phosphorous substance is a phosphate.

13. The process of claim 2, wherein the phosphorous substance reacts with alkaline metal chlorides in gaseous phase according to the general formula:

$$MCl + PO + H_2O \Leftrightarrow MPO + HCl,$$

where MCl represents a metal chloride and PO represents a phosphorous oxide.

14. The process of claim 3, wherein the phosphorous substance reacts with alkaline metal chlorides in gaseous phase according to the general formula:

$$MCl + PO + H_2O \Leftrightarrow MPO + HCl,$$

where MCl represents a metal chloride and PO represents a phosphorous oxide.

15. A method of reducing the corrosiveness of alkaline metal chloride present in flue-gas of a solid fuel combustion plant, the combustion plant having a combustion chamber from which the flue-gas flows past a heat transfer device, the method comprising:
  adding a phosphorous substance to the flue-gas at a location upstream of the heat transfer device, the flue-gas having a temperature of 500-1200° C. and the phosphorous substance capable of forming phosphorous oxide when at combustion temperatures of about 500° C. or higher,
  forming phosphorous oxide in the flue-gas from the phosphorous substance in the flue-gas,
  reacting the phosphorous oxide with gaseous phase alkaline metal chloride in the flue-gas to form alkaline metal phosphate in the flue-gas.

16. The method of claim 15, wherein the amount of alkaline metal chloride in the flue-gas is reduced by 50% to 80%.

17. The method of claim 15, wherein the phosphorous substance is phosphoric acid ($H_3PO_4$).

18. The method of claim 15, wherein the phosphorous substance is a phosphate.

19. The method of claim 15, wherein the phosphorous substance is ammonium phosphate (($NH_4)_3PO_4$), ammonium dihydrogen phosphate (($NH_4)H_2PO_4$), diammonium hydrogen phosphate (($NH_4)_2HPO_4$) or any combination thereof.

* * * * *